United States Patent

[11] 3,634,011

[72] Inventor Karl O. R. Scholdstrom
Lidingo, Sweden
[21] Appl. No. 875,407
[22] Filed Nov. 10, 1969
[45] Patented Jan. 11, 1972
[73] Assignee Aga Aktiebolag
Lidingo, Sweden
[32] Priority Dec. 19, 1968
[33] Sweden
[31] 17510/68

[54] OPTICAL RANGE FINDER
4 Claims, 1 Drawing Fig.
[52] U.S. Cl. .................................................. 356/5,
356/4, 95/44 C
[51] Int. Cl. ............................................... G01c 3/08
[50] Field of Search ........................................ 356/4, 5;
95/44 C

[56] References Cited
UNITED STATES PATENTS
| | | | |
|---|---|---|---|
| 3,274,913 | 9/1966 | Biedermann et al. | 95/44 C |
| 3,489,495 | 1/1970 | Blau et al. | 356/4 |
| 3,464,770 | 9/1969 | Schmidt | 356/4 |
| 2,966,824 | 1/1961 | Granquist | 356/5 |

Primary Examiner—Rodney D. Bennett, Jr.
Assistant Examiner—S. C. Buczinski
Attorney—Larson, Taylor & Hinds ABSTRACT: An optical rangefinder in which light transmitted to and reflected from a distant object is compared to determine that distance, is improved by providing means to adjust the divergence of the beam of transmitted or reflected light or both to facilitate impingement of the light beam on the object, on the receiver, or both. The improvement is particularly useful in devices which employ a laser light source, particularly a gas laser light source, which transmits a very narrow beam of parallel light.

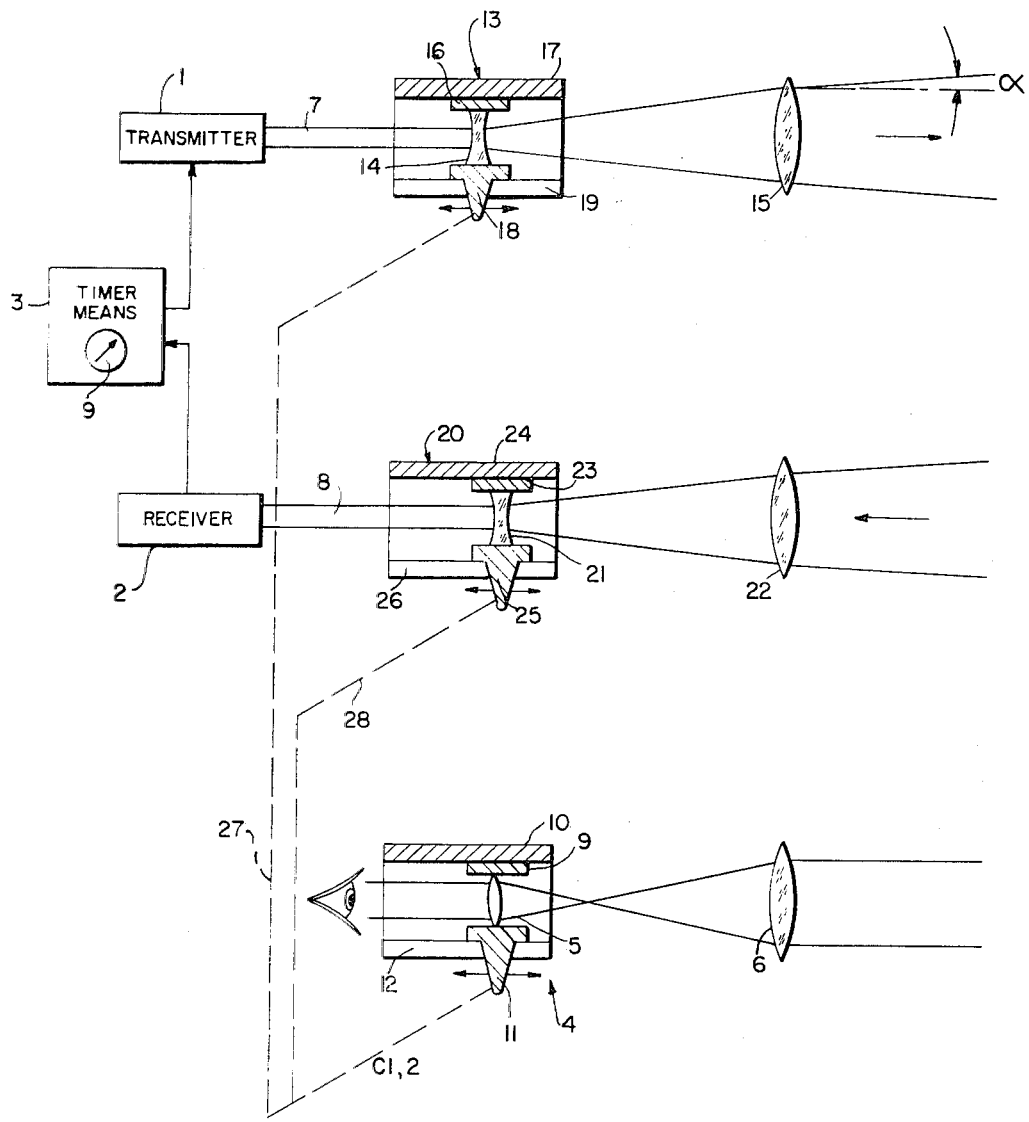

3,634,011

OPTICAL RANGE FINDER

BACKGROUND OF THE INVENTION

The invention relates to an optical rangefinder of the type that transmits a beam of parallel light, which is reflected at the far end of the distance to be measured and is received by a receiver, a measurement being made of the time required by the light in traversing the distance. A viewing system is usually provided for locating the distant reflector. Devices of this type are well known in the art and are generally described, for example, in U.S. Pat. Nos. 2,234,329; 2,966,824; and 3,130,403, the disclosures of which are incorporated herein by reference. Typical devices are sold by the AGA Corporation of America under the trademark "Geodimeter" and may include a laser light source, such as a gas laser, which produces a very parallel beam of light.

In a rangefinder of this type which is to be used for large distances as well as shorter ones down to the order of 10 meters, it may be difficult to direct the transmitted beam on the distant reflector, particularly with modern laser light sources, which produce an extremely narrow beam of parallel light. The area covered by the beam generally increases in proportion to the square of the distance. Therefore, if this area is sufficiently large at maximum distance to make it possible to find the center of the beam with the reflector, the cross-sectional area at the shortest distances will be so small as to make it practically impossible to locate the beam. The problem is particularly pronounced when gas lasers are used. With such a laser it is possible to produce a beam whose diameter at a distance of 1 kilometer is 1 meter which means that at a distance of 100 meters, the diameter will be only 10 cm.

There is also a similar problem at the receiver of the rangefinder in that it may often by desirable to let a light beam of predetermined diameter act on the light-sensitive device. A conventional form for such a receiver device is a photomultiplier, which is characterized by a variable transit time for electrons which are released from different portions of the light-sensitive cathode. It is therefore preferred to restrict the area of the cathode which is impinged by the light so as to reduce this difference in transit time.

Rangefinders of the type referred to are usually provided with a viewing system for facilitating orientation of the apparatus and sighting on the distant reflector.

SUMMARY OF THE INVENTION

According to the invention, means are provided for adjusting the optical system of the transmitting or the receiving unit or both of the rangefinder to vary the focal length (divergence) thereof. The device preferably includes a viewing system to locate the distant object and, in that event, means to adjust the focal length of the viewing system in unison with changes in divergence of the transmitted or reflected light beams or both may be provided. In this manner, the divergence of the transmitted beam or the impinged area on the receiver cathode, or both, can be made to vary with the distance adjustment in a desired manner.

THE DRAWING

The drawing shows schematically an optical rangefinder provided with an embodiment of the invention, in which the focal length of both the transmitter and the receiver optical system is adjustable in unison with that of the viewing system.

DETAILED DESCRIPTION

With reference to the drawing, an optical rangefinder comprises a transmitter 1, a receiver 2, and means 3 to measure the time required by the transmitted light to be reflected from the object to the receiver. The device also includes a viewing system 4 comprising a first lens system which includes an eyepiece 5 and an objective lens 6. This conventional device is operated by transmitting a beam of light 7 from the light source of the transmitter, which may be a laser or other source conventional in devices of this type, to a distant object not shown. The viewing system is used to assist in locating the object and in impinging the light beam upon the object. The object is usually a highly reflective surface such as a mirror. Light beam 8 as reflected from the object impinges upon the receiver which usually comprises a photosensitive cathode, and the light beams are compared by conventional timer means 3 to determine the time lapse between transmission and reception from which the distance can be determined accurately since the velocity of light is known to a high degree of accuracy. The device is conveniently provided with a readout dial 9 which indicates distance directly.

According to the present invention, the device is provided with means to adjust the divergence of at least one of the beams of transmitted and reflected light to facilitate, respectively, impingement of the light beams on the object and on the receiver. In the embodiment shown, the device is provided with means to adjust both beams, and the viewing means comprises a lens system the focal length of which is adjustable in unison with either or both of the transmitted and reflected light beam adjustment means.

The viewing system shown comprises a first lens system 4 including an eyepiece 5 and an objective lens 6 moveable relative thereto. The objective lens 6 is fixed in a suitable support and the eyepiece is moveable by means of a lens holder 9 moveable in a fixed support 10 by means of a knob 11 protruding through a slot 12 in support 10.

The device is provided with a second lens system 13 comprising a negative lens 14 and a positive lens 15 moveable relative thereto. Lens 15 is fixed in the same manner as lens 6 and lens 14 is moveable in lens holder 16 in a fixed support 17 in the same manner as lens 5 by means of a knob 18 protruding through slot 19 in support 17.

The device is further provided with a third lens system 20 comprising a negative lens 21 and a positive lens 22 moveable relative thereto. Lens 22 is fixed and lens 21 is moveable in lens holder 23 moveable in fixed support 24 by means of a knob 25 protruding through slot 26 in support 24.

The device also includes a first mechanical coupling means 27 coupling movement of lenses 5 and 14 to change the focal length of the viewing system in unison with charges in divergence of the path of transmitted light, and a second mechanical coupling means 28 coupling movement of lenses 5 and 21 to change the focal length of the viewing system in unison with changes in divergence of the path of reflected light.

The simplest manner of explaining the operation of the invention is to start from the adjustment to an "infinitely" large distance, which means a distance at which the divergence $\alpha$ of the emitted beam is at a minimum and practically zero where a gas laser is employed, and the received light passed through the optical systems 20 and 4 is also in the form of parallel light rays. Starting from this initial condition, to adjust for a smaller distance of the reflector, the divergence $\alpha$ of the emitted beam should be increased so as to result in roughly the same beam diameter at the object for the smaller distance. Similarly, the reflector should be imaged by the receiving system 20 to have approximately the same size on the cathode of the light sensitive device in the receiver R. As a first-degree approximation, it can be assumed that the adjustments required for the moveable lenses 14 and 21 are proportional to $\alpha$ and it is obvious that the same thing is true also with regard to the adjustment of lens 5 of the viewing system 4 which is required for focusing at the smaller distance. Therefore, the device is provided with mechanical coupling 27, 28 as indicated by dash lines to cause a movement of lens 5 to correspond to proportional movements, in the opposite sense, of either of lenses 14, 21 or both.

What is claimed is:

1. In an optical rangefinder which comprises a light transmitter for transmitting a beam of light to a distant object, a light receiver for receiving a beam of light reflected from the object, and means to measure the time required by the transmitted light to be reflected from the object to the receiver; the improvement which comprises: adjustment means comprising a first lens system to adjust the divergence of at least one of the beams of transmitted and reflected light; and viewing means to locate the object comprising a second lens system which is adjustable in unison with said adjustment means to vary the focal length of said second lens system in unison with changes in the divergence of at least one of the transmitted and reflected light beams.

2. An improved optical rangefinder according to claim 1, wherein said first lens system comprises a positive lens and a negative lens moveable relative thereto along the path of the beam of transmitted light.

3. An improved optical rangefinder according to claim 1, wherein said first lens system comprises a positive lens and a negative lens moveable relative thereto along the path of the beam of reflected light.

4. An improved optical rangefinder according to claim 1, wherein said first lens system comprises a positive lens and a negative lens moveable relative thereto along the path of the beam of transmitted light and a positive lens and a negative lens moveable relative thereto along the path of the beam of reflected light.

* * * * *